United States Patent [19]

Boniort et al.

[11] 4,142,063

[45] Feb. 27, 1979

[54] HIGH-FREQUENCY ELECTRIC FURNACE

[75] Inventors: Jean-Yves Boniort, Limours; Claude Brehm, Montrouge; Yves Floury, Villebon sur Yvette, all of France

[73] Assignee: Compagnie Generale d'Electricite, Paris, France

[21] Appl. No.: 889,306

[22] Filed: Mar. 23, 1978

[30] Foreign Application Priority Data

Mar. 29, 1977 [FR] France .................. 77 09311

[51] Int. Cl.² ........................................ H05B 5/00
[52] U.S. Cl. .................................. 13/27; 13/31 R; 219/10.49 R; 219/10.61 R
[58] Field of Search ...................... 13/26, 27, 31; 219/10.49 R, 10.61, 10.51, 10.57

[56] References Cited

U.S. PATENT DOCUMENTS

| | | | |
|---|---|---|---|
| 3,696,223 | 10/1972 | Metcalf et al. | 219/10.49 |
| 3,860,737 | 1/1975 | Moscatello | 219/10.49 X |
| 4,070,542 | 1/1978 | Miles et al. | 219/10.49 R X |

*Primary Examiner*—R. N. Envall, Jr.
*Attorney, Agent, or Firm*—Sughrue, Rothwell, Mion, Zinn and Macpeak

[57] ABSTRACT

The invention relates to a high-frequency furnace whose wall is formed by superposed wall-forming members. This furnace includes in particular an inner tubular wall comprising a zirconia tube (38), an alumina washer (39) laid on the zirconia tube and a silica tube (40) laid on the washer. There is a large groove (41) in a top plate (37) to accommodate the silica tube (40). The furnace also includes an outer tube (36) of silica. This structure makes it possible to accommodate differential expansion of the zirconia and the silica in two separate steps. The axial difference is accommodated at the groove (41) while the radial difference is accomodated at the washer (39). Leakage of inert gas pumped into the chamber during operation can then be maintained within acceptable limits throughout the temperature range. Application to the production of optical fibers.

9 Claims, 1 Drawing Figure

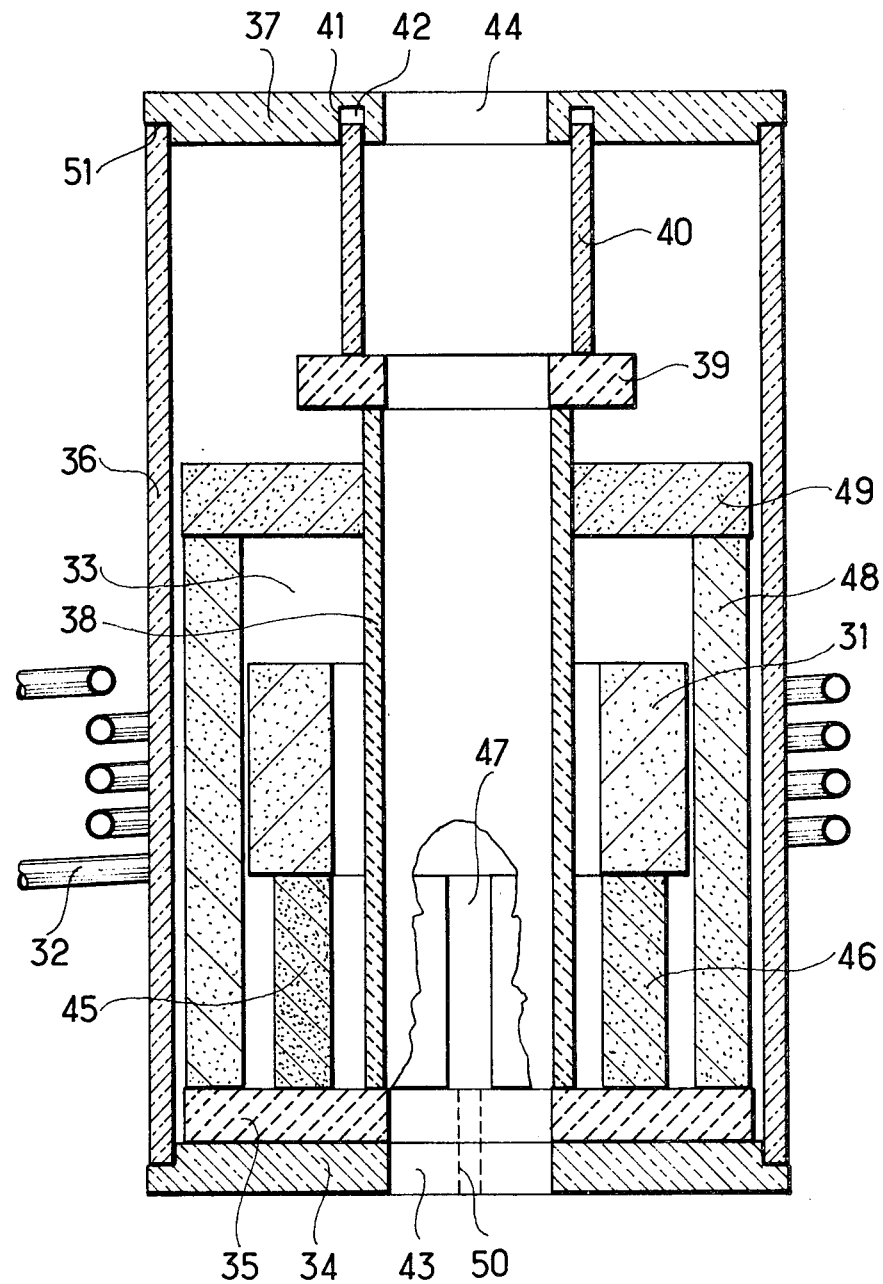

HIGH-FREQUENCY ELECTRIC FURNACE

FIELD OF THE INVENTION

The present invention relates to an induction furnace.

BACKGROUND OF THE INVENTION

An induction furnace is known which comprises
a tubular induction heater disposed vertically and made of a material which is oxidizable at high temperature.

A toroidal chamber encloses said heater, the chamber being constituted by an assembly of superposed wall-forming members including: a horizontal lower plate; an outer tube and an inner tube which are substantially co-axial and rest vertically on said lower plate with the heater disposed co-axially between the tubes and an upper plate resting horizontally on the tubes. The upper and the lower plates each are provided with an opening to the bore of the inner tube to enable objects to be passed through the heater for heating.

An induction coil is disposed around the outer tube for receiving high-frequency electric current to induce heating eddy currents in the heater.

Further, means are provided for introducing an inert gas into said chamber at sufficient pressure for the gas contained in the chamber to escape through gaps between the contact surfaces of the said superposed wall-forming members.

In this furnace, the gaps between the superposed members must be of small cross-section to prevent air from entering the chamber during operation. To do this, the upper plate is evenly supported in practice not only on the outer tube but also the inner tube.

In general, the outer and inner tubes as well as the upper plate are made of the same refractory material such as silica, this making it possible to reach a maximum operation temperature of about 1600°. When it is required to produce a furnace which operates at a higher temperature, the inner tube is made of zirconia or thoria for example. Because of their high price, these materials are used only for the inner tube, the silica outer tube being protected against radiation of the induction heater by interposition of a thermally insulative tube. But zirconia and thoria have relatively high coefficients of expansion and while the temperature of the furnace is rising, it appears that the upper plate laid on the inner tube rises because of the longitudinal expansion of this tube. A large gap then appears between the upper plate and the outer tube which causes air to enter and consequently rapidly damages the induction heater which is made of an oxidisable material such as graphite or tungsten.

To mitigate this disadvantage, it has been proposed to provide a disposition in which the upper part of the inner tube is engaged in a groove formed in the upper plate, an axial gap being provided at ambient temperature between the end of the inner tube and the bottom of the groove, this gap having sufficient size to compensate for the difference of expansion between the silica and the zirconia. But it then appears that a radial clearance must also be provided between the end of the wall and the groove to account for the radial expansion of the inner tube. In these conditions, the radial gaps and axial gaps which must be provided at ambient temperature between the inner tube and the groove in which it is lodged are too great and permit oxidation of the induction heater during the rise in temperature of the furnace.

The present invention aims to mitigate these disadvantages and to provide an induction furnace which can operate at a high temperature.

The present invention provides a high-frequency electric furnace comprising:

a tubular induction heater disposed vertically and made of a material which is oxidizable at high temperature;

toroidal chamber enclosing said heater, the chamber being constituted by an assembly of superposed wall-forming members including: a horizontal lower plate; an outer tube means and an inner tube means which are substantially coaxial and rest vertically on said lower plate with the heater disposed co-axially between the tube means and an upper plate resting horizontally on the tube means; the upper and the lower plates each being provided with an opening to the bore of the inner tube means to enable objects to be passed through the heater for heating;

induction coil disposed around the outer tube means for receiving high-frequency electric current to induce heating eddy currents in the heater;

and means for introducing an inert gas into said chamber at sufficient pressure for the gas contained in the chamber to escape through gaps between the contact surfaces of the said superposed wall-forming members.

The improvement resides in said inner tube means comprising an assembly of:

a first inner tube made of a first refractory material and resting on the lower plate;

a horizontally disposed washer resting on the upper end of the first inner tube; and a second inner tube resting on the washer and whose upper end is engaged in a groove provided in the upper plate and sufficiently deep for a gap to remain between the upper end of the second tube and the base of the groove at ambient temperature; the second inner tube, the upper plate and the outer tube means being made of a second refractory material having both a maximum operation temperature and a coefficient of expansion which are lower than those of the first refractory material, differential expansion during heating between the first inner tube and the other wall-forming members being accommodated longitudinally by the depth of the said groove and radially by sliding on the washer, whereby the gas-passing gaps between the contact surfaces of the wall-forming members remain of substantially constant size throughout the temperature range from ambient to maximum operating temperature.

BRIEF DESCRIPTION OF THE DRAWING

The invention is described hereinbelow by way of an example having no limiting character and with reference to the accompanying drawing in which the sole FIGURE is a vertical sectional view which shows an embodiment of the furnace in accordance with the invention.

DESCRIPTION OF THE PREFERRED EMBODIMENT

In this FIGURE, a tubular graphite or tungsten induction heater 31 is disposed vertically. Its outer cylindrical suface is surrounded by an electrical conductor coil 32 constituted by a copper tube whose two ends can be connected to the terminals of a high-frequency electric generator (not shown).

The induction heater 31 is disposed inside a toroidal chamber 33 whose walls are formed by superposed wall-forming members. These walls comprise a horizontal lower plate constituted by a silica plate 34 on which is laid a protective plate 35 made of a refractory material whose maximum operation temperature is higher than that of silica. This material can be alumina or zirconia for example. An outer tubular wall 36 constituted by a silica tube disposed between the coil 32 and the induction heater 31 is laid vertically on the edges of the plate 34. An upper horizontal plate 37 made of silica is laid on the upper end of the wall 36. Lastly, the chamber 33 includes an inner tubular wall which passes through the interior volume of the induction heater 31 and extends from the plate 35 to the plate 37, this inner wall, the wall 36 and the induction heater 31 being substantially coaxial.

In accordance with one disposition of the invention, the inner tubular wall comprises the following members:

a vertical tube 38 made of zirconia or thoria which rests on the plate 35 and which passes through the interior volume of the induction heater 31, the upper end of the tube 38 being situated at a level lower than that of the tubular wall 36;

a washer 39 made of alumina or zirconia, laid horizontally on the upper end of the tube 38; and a second vertical tube 40 laid on the washer 39. The tube 40 is made of silica or of a refractory material which has a coefficient of expansion close to that of silica. The upper end of the tube 40 engages in a circular groove 41 formed in the plate 37 so that a gap 42 remains between the upper end of the tube 40 and the base of the groove.

The plate 34, 35 and the plate 37 include respectively two central openings 43 and 44 through which objects to be heated can be passed into an interior volume of the tube 38.

The induction heater 31 is held inside the chamber 33 by an insulating support laid on the plate 35. This tubular support is made preferably of the same material as the induction heater and then comprises several parts separated from one another. In the device shown, this support is formed by three parts two of which (45 and 46) are shown in the FIGURE, the parts 45 and 46 being spaced apart by a gap 47.

Graphite felt is disposed inside the chamber 33, particularly between the induction heater 31 and the silica components of this chamber facing the induction element, i.e. the wall 36, the plate 37 and the tube 40. Thus, a cylindrical graphite felt tube 48 is disposed between the induction heater 31 and the wall 35 and a graphite felt washer 49 is laid horizontally on the tube 48 a little below the washer 39 to insulate the induction heater 31 thermally from the upper part of the chamber 33. It is also possible to dispose graphite felt under the induction heater 31, around the support parts 45 and 46.

Lastly, the lower plates 34 and 35 are fitted with at least one aperture 50 in order to make it possible to feed an inert gas into the chamber 33. These plates can comprise for example two apertures which are symmetrical in relation to the axis of the furnace to make the gas flow more homogenous in the chamber. The aperture 50, shown by dotted lines in the FIGURE, leads into the gap 47 between the parts 45 and 46 of the support of the induction heater.

The furnace described hereinabove operates as follows:

An inert gas such as argon or nitrogen is brought into the chamber 33 through the aperture 50 at a sufficient pressure for there to be a small overpressure in the chamber taking into account the leakage of the gas through the spaces which remain between the contact surfaces of the superposed components, e.g. at 51 between the tube 36 and the plate 37. To begin with, the gas of the chamber is constituted by a mixture of air and argon for example, but after a fairly short time, this mixture is driven out and the chamber 33 contains a very high proportion of argon which passes at a low flow rate through the above-mentioned gaps. The input of inert gas through the bottom of the chamber is preferable at the input through the top since it allows a more rapid removal of the air contained in the chamber.

Then the ends of the electrical conductor coil 32 are connected to the terminals of the high-frequency electric generator and water is caused to flow in the electrical conductor coil 32 to cool it. The electric field set up by the current flowing in the conductor coil 32 produces a high electric current in the induction element 31 which does not become oxidized due to the presence of argon. The frequency of the inducing current is chosen between 10 and 50kHz so that no current will be induced in the graphite felt parts 48 and 49. Likewise, no current is generated in the support of the induction heater 31 due to the existence of gaps such as 47 provided between the parts of this support.

Under the effect of the heat energy given off by the induction heater 31, the temperture of the tube rises rapidly, particularly in the zone of the tube 38 which faces the induction heater 31. This rise in temperature causes axial expansion of the tube 38 which is very much greater than that of the silica wall 36; under the effect of this expansion, the tube 40 is pushed upwards and enters more deeply into the groove 41. Of course, the length of the gap 42 at ambient temperature is chosen so that at the operation temperature of the furnace, the upper end of the tube 40 does not bear against the bottom of the groove 41. Thus, raising of the upper plate 37 is prevented. The clearance between the two upper cylindrical surfaces of the tube 40 and the interior surface of the groove 41 can be very small at the outset, to avoid any excessive leakage of gas. Indeed, the tube 40 and the plate 37 are made of the same material, silica for example, whose coefficient of expansion is much lower than that of zirconia or thoria. The tube 40 and the plate 37 expand relatively little and in the same proportions. The above-mentioned clearance remains small at high temperature and further the upper part of the tube 40 is not in danger of being jammed in the groove 41 during the rise in temperature of the furnace.

Consequently, at no moment, whether at ambient temperature or at operation temperatures do the gaps between the contact surfaces of the superposed components of the chamber present sufficiently great cross sections to admit air into the chamber and to cause damage to the oxidisable parts such as the induction elements 31, the support parts 45 and 46, the tube 48 and the washer 49.

The graphite felt tube 48 is a thermal insulator which withstands higher temperatures than the thermally insulative alumina tube which is provided between the induction heater and the outer wall of the furnace in the device according to the abovementioned prior art. The washer 49 prevents loss of heat towards the upper end of the furnace. The graphite felt parts such as 48 and 49 are protected from oxidation at high temperature by the presence of the inert gas in the chamber 33.

The maximum operation temperatures of zirconia or of thoria which constitute the tube 38 are very much higher than that of silica. It is therefore possible to obtain a temperature of more than 2200° C. in the heating zone i.e. in the bore of the tube 38, at the level of the induction heater 31.

The furnace described hereinabove can be applied to glass work and in particular to the production of optical fibres. It can be used in particular for locally heating a glass tube whose length is greater than the height of the furnace, for performing vapour phase deposition for example. In this case, the inside diameter of the tube 40 is preferably larger than that of the tube 38, to prevent the outside diameter of the glass tube to be heated from being limited by the diameter of the opening 44 of the upper plate 37.

What is claimed is:

1. A high-frequency electric furnace comprising:
   a tubular induction heater disposed vertically and made of a material which is oxidizable at high temperature;
   a toroidal chamber enclosing said heater, the chamber being constituted by an assembly of superposed wall-forming members including: a horizontal lower plate; an outer tube means and an inner tube means which are substantially co-axial and rest vertically on said lower plate with the heater disposed co-axially between the tube means; and an upper plate resting horizontally on the tube means; said upper and said lower plates each being provided with an opening which opens to the bore of the inner tube means to enable objects to be passed through the heater for heating;
   an induction coil disposed around the outer tube means for receiving high-frequency electric current to induce heating eddy currents in the heater;
   and means for introducing an inert gas into said chamber at sufficient pressure for the gas contained in the chamber to escape through gaps between the contact surfaces of said superposed wall-forming members; the improvement wherein:
   said inner tube means comprises an assembly of:
   a first inner tube made of a first refractory material and resting on the lower plate and extending less than the axial extent of said outer tube means;
   a horizontally disposed washer resting on the upper end of the first inner tube; and
   a second inner tube resting on the washer and whose upper end is engaged in a groove provided in the upper plate and sufficiently deep for a gap to remain between the upper end of the second inner tube and the base of the groove at ambient temperature; the second inner tube, the upper plate and the outer tube means being made of a second refractory material having both a maximum operation temperature and a coefficient of expansion which are lower than those of the first refractory material, differential expansion during heating between the first inner tube and the other wall-forming members being accommodated longitudinally by the depth of said groove and radially by sliding on the washer, whereby the gas-passing gaps between the contact surfaces of the wall-forming members remain of substantially constant size throughout the temperature range from ambient to maximum operating temperature.

2. A furnace according to claim 1, including graphite felt disposed in the toroidal chamber between the induction heater and the wall-forming members which are made of said second refractory material.

3. A furnace according to claim 1, wherein the inner diameter of the second inner tube is greater than the inner diameter of the first inner tube.

4. A furnace according to claim 1, wherein the lower plate has at least one aperture for feeding the inert gas into said chamber.

5. A furnace according to claim 1, including a support resting on the lower plate to support said induction heater, this support being made of the same material as the induction heater and comprising a plurality of parts separated from one another so as to prevent an induced current flowing in this support when a high-frequency electric current flows in the conductor coil.

6. A furnace according to claim 1, wherein the lower plate is formed by a plate of said second refractory material on which there rests a protective plate made of refractory material whose maximum operation temperature is higher than that of the second refractory material.

7. A furnace according to claim 1, wherein the first refractory material is chosen from the group formed by zirconia and thoria.

8. A furnace according to claim 1, wherein the second refractory material is silica.

9. A furnace according to claim 1, wherein said material which is oxidisable at a high temperature is chosen from the group formed by graphite and tungsten.

* * * * *